United States Patent
Yoshimura

(10) Patent No.: US 7,359,338 B2
(45) Date of Patent: Apr. 15, 2008

(54) METHOD AND APPARATUS FOR TRANSFERRING PACKETS IN NETWORK

(75) Inventor: Masahiko Yoshimura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1101 days.

(21) Appl. No.: 10/228,951

(22) Filed: Aug. 28, 2002

(65) Prior Publication Data

US 2003/0053421 A1   Mar. 20, 2003

(30) Foreign Application Priority Data

Sep. 17, 2001 (JP) .............................. 2001-282336
May 31, 2002 (JP) .............................. 2002-158903

(51) Int. Cl.
*H04L 12/28* (2006.01)
(52) U.S. Cl. ...................................... 370/254; 370/400
(58) Field of Classification Search ................ 370/254, 370/351, 389, 392, 400, 401
See application file for complete search history.

(56) References Cited

U.S. PATENT DOCUMENTS

| | | | |
|---|---|---|---|
| 5,708,654 A * | 1/1998 | Arndt et al. ................. | 370/242 |
| 2001/0056499 A1 * | 12/2001 | Shirai et al. ................. | 709/245 |
| 2002/0087889 A1 * | 7/2002 | Zaborovsky et al. ........ | 713/201 |
| 2003/0039240 A1 * | 2/2003 | Sutanto ....................... | 370/352 |
| 2003/0076830 A1 * | 4/2003 | Asano .......................... | 370/392 |
| 2004/0109460 A1 * | 6/2004 | Banks et al. ................. | 370/401 |

FOREIGN PATENT DOCUMENTS

JP   2001-091241   3/2001

OTHER PUBLICATIONS

European Search Report dated Feb. 28, 2006, in counterpart European application No. 02019461.9.
Robert Wagner, "Address Resolution Protocol Spoofing and Man-in-the-Middle Attacks", Internet Article, 'Online! Aug. 13, 2001, pp. 1-7, XP002367742, retrieved from the Internet: URL:http://www.sans.org/rr/whitepapers/threats/474.phphttp://www.sans.org/rr/whitepapers/threats/474.php >, retrieved on Feb. 14, 2006.
N.B. Riser, "Spoofing: An Overview of Some the Current Spoofing Threats", Internet Article, Jul. 1, 2001, pp. 1-5, XP002367743.

* cited by examiner

*Primary Examiner*—Wing Chan
*Assistant Examiner*—Saba Tsegaye
(74) *Attorney, Agent, or Firm*—Finnegan, Henderson, Farabow, Garrett & Dunner, L.L.P.

(57) ABSTRACT

There is provided a packet transfer apparatus with a function of performing packet request for a server on a network in the state where stealth characteristics are secured. The apparatus performs packet request using address information of the server on the network. Further, the apparatus identifies and acquires a packet requested by the apparatus itself among packets received from the server on the network.

7 Claims, 5 Drawing Sheets

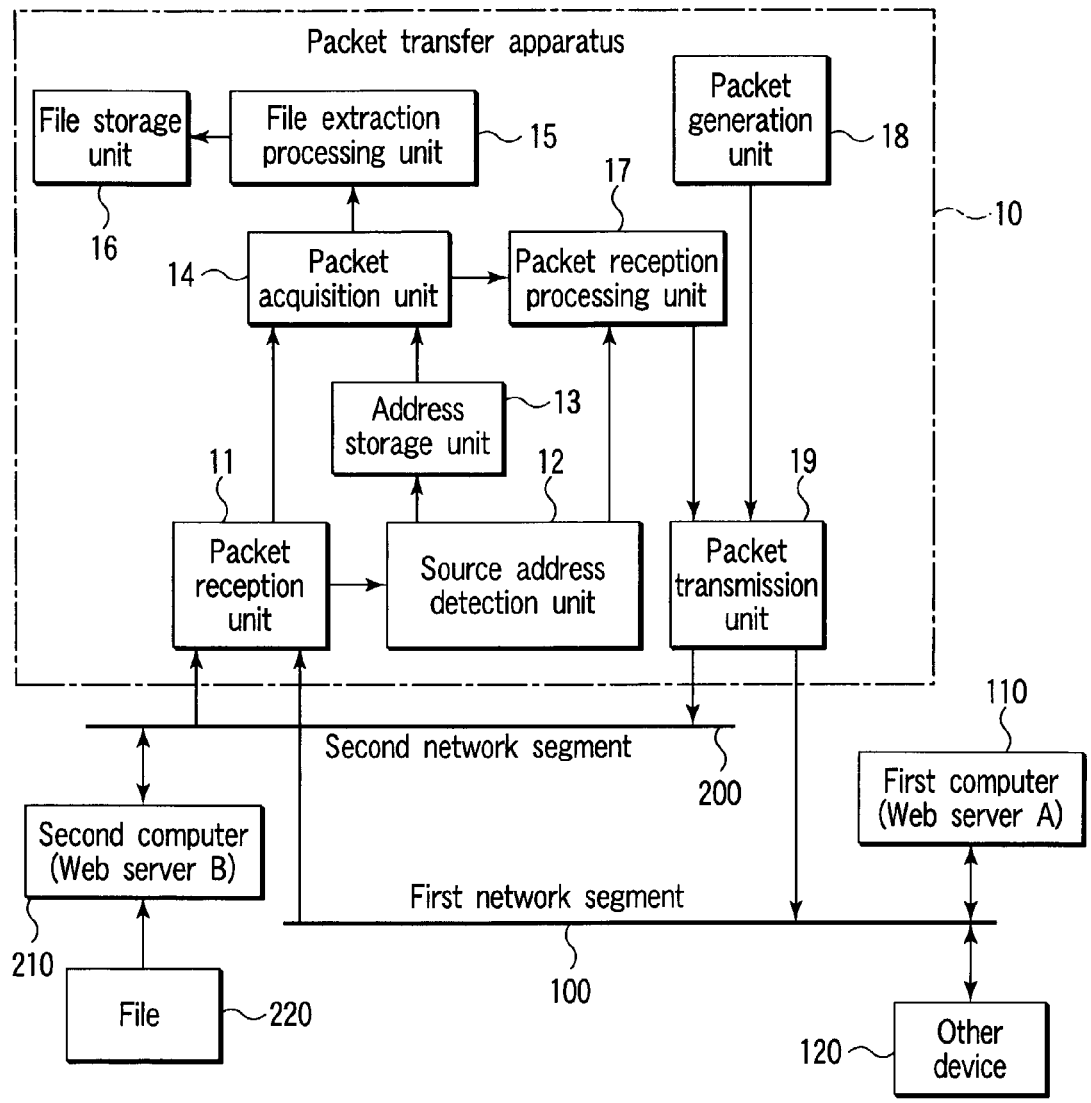
F I G. 1

| | Source (Web server A) | Destination (Web server B) | Local (Packet transfer apparatus) |
|---|---|---|---|
| MAC address | 131 | 134 | 137 |
| IP address | 132 | 135 | 138 |
| Port number | 133 | 136 | 139 |

13(23)

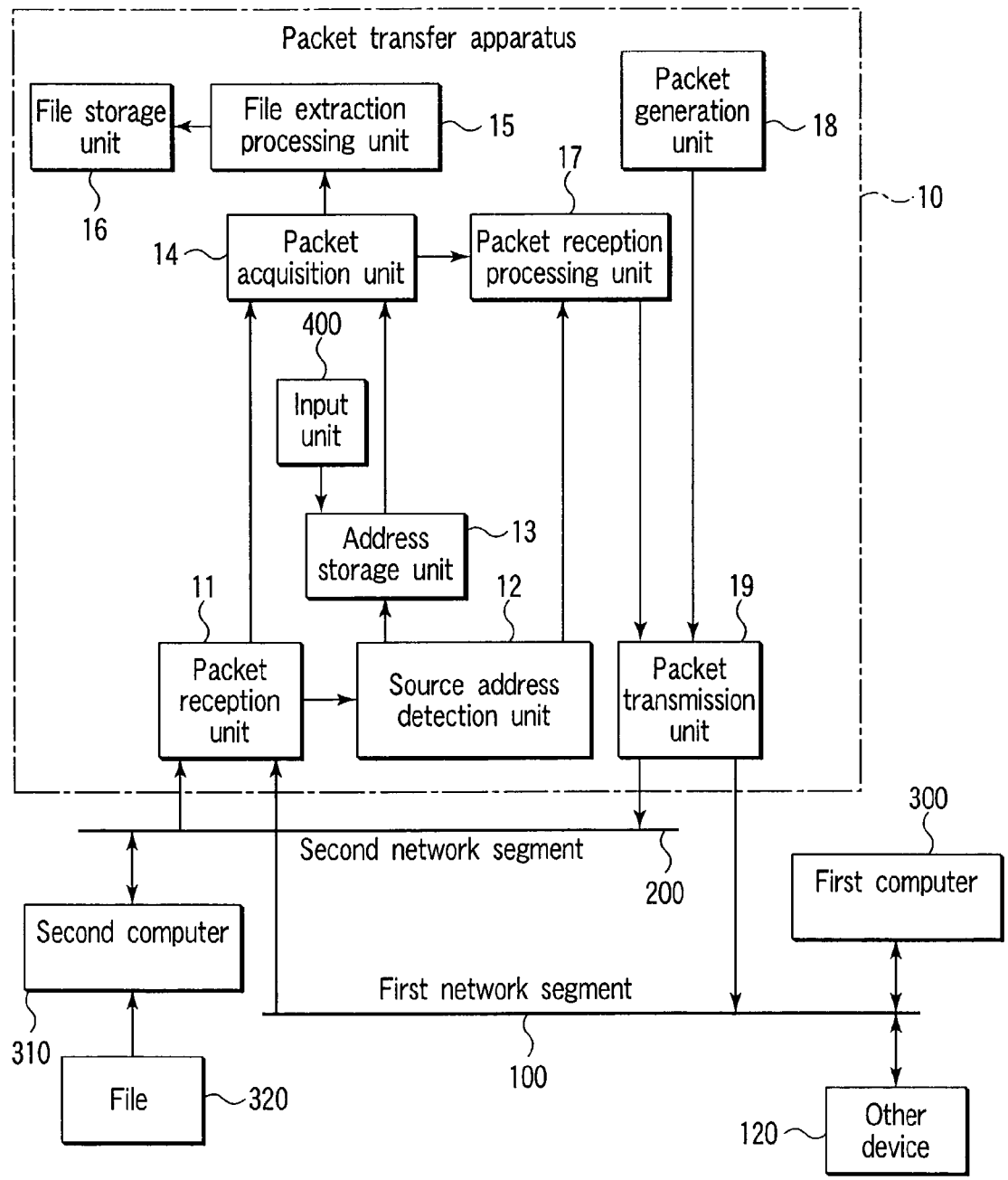
F I G. 7

METHOD AND APPARATUS FOR TRANSFERRING PACKETS IN NETWORK

CROSS-REFERENCE TO RELATED APPLICATIONS

This application is based upon and claims the benefit of priority from the prior Japanese Patent Applications No. 2001-282336, filed Sep. 17, 2001; and No. 2002-158903, filed May 31, 2002, the entire contents of both of which are incorporated herein by reference.

BACKGROUND OF THE INVENTION

1. Field of the Invention

The present invention generally relates to an apparatus and method for transferring packets switched among a plurality of network segments, particularly to a technique for acquiring packets in the state where stealth characteristics are secured.

2. Description of the Related Art

In order to switch packets among a plurality of network segments (simply denoted as segments), for example, a packet transfer apparatus (packet relay apparatus) such as a router is generally provided on a computer network.

The packet transfer apparatus generally includes a computer as a main component so that some software (program and data) is used for operating the computer. Therefore, in the packet transfer apparatus, it is necessary to update a program or data included in the existing software.

Such a method of updating software is generally to access a server connected to, for example, Internet and to download and acquire an update file from the server. Thereby, the packet transfer apparatus can easily and rapidly acquire an update file to realize update of the software.

In packet transfer apparatuses in recent years, some apparatuses have a function of operating as a network protect system for preventing malicious accesses from, for example, hackers.

There is a case where such a packet transfer apparatus accesses a server as described above, and acquires an update file for updating software of the system. In this case, the packet transfer apparatus transmits the unique address (IP address and the like) on the network. Therefore, there is a possibility that the presence of the packet transfer apparatus is recognized by other devices on the network. Particularly, if the presence as the network protect system is recognized by the third party, it is not preferable that there occurs a situation the apparatus is easy to be attacked by hackers.

In order to eliminate security problems as described above, there is a method of reading an update file from a local storage medium such as a floppy disk or CD-ROM without accessing files on the network. Further, this is a method of transferring the update file from a computer serial-connected with the packet transfer apparatus. However, such a method is remarkably inefficient since complicated works are required as compared with convenience of the network capable of easily and rapidly acquiring an update file.

Therefore, it is desirable for a device on a networks, such as the packet transfer apparatus, to acquire an update file from the network. For example, on the network of TCP/IP protocol, a communication party can be recognized by a MAC (media access control) address, an IP (internet protocol) address, and a port number.

Therefore, when a unique address including the MAC address and the IP address is not assigned, the device such as the packet transfer apparatus on the network cannot perform communication on the network. However, it is possible to acquire and transfer all packets passing on the network to designated destinations instead of that the presence of the apparatus is not known by other devices on the network. Characteristics capable of concealing the presence of the apparatus from other devices on the network is called stealth characteristics.

However, a device on a network, such as the packet transfer apparatus, cannot communicate with any other device on the network if stealth characteristics that prohibit the transmission of the unique address are secured. In this case, an update file cannot be acquired from the devices.

BRIEF SUMMARY OF THE INVENTION

It is an object of the present invention to provide a packet transfer apparatus capable of acquiring packets including an update file and the like from a network in the state where so-called stealth characteristics are secured.

An apparatus for transferring packets among network segments in a network according to one aspect of the present invention comprises: packet request means for performing transmission request of packets with a first computer connected to a first network segment as a source and with a second computer connected to a second network segment as a destination; means for, when a packet transmitted from the second computer is received, determining whether or not the received packet is a response packet whose destination is the first computer; and means for, when it is determined by the determining means that the received packet is the response packet, acquiring the packet as a request packet.

BRIEF DESCRIPTION OF THE SEVERAL VIEWS OF THE DRAWING

FIG. 1 is a block diagram showing essential parts of a packet transfer apparatus according to a first embodiment of the present invention;

FIG. 7 is a block diagram showing essential parts of a packet transfer apparatus according to a third embodiment of the present invention.

DETAILED DESCRIPTION OF THE INVENTION

Figures 2, 3:
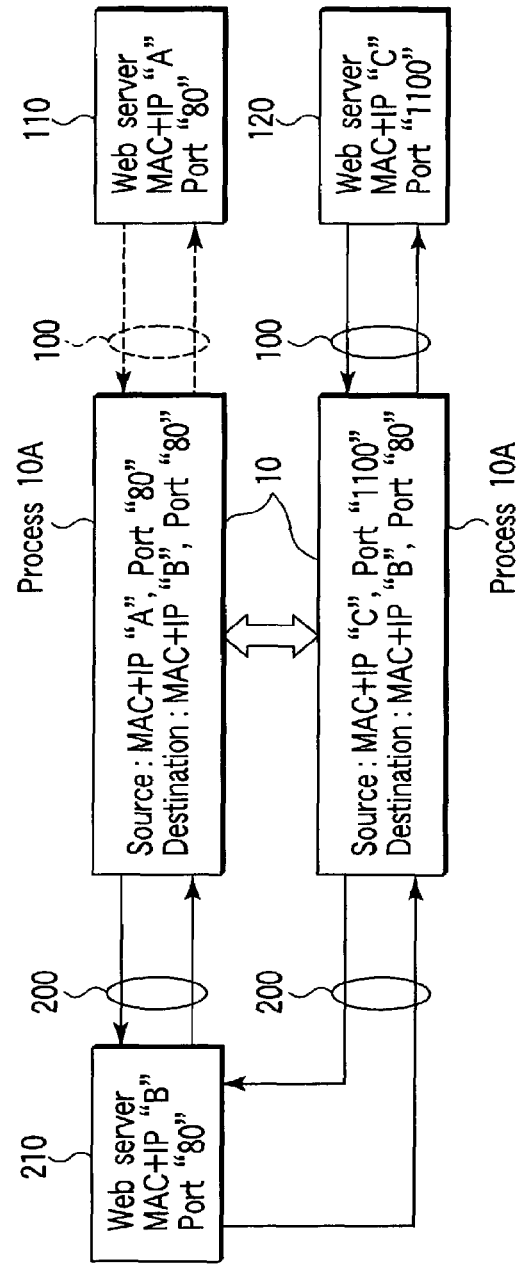
FIG. 2 is a diagram for explaining a configuration of an address storage unit according to the first and second embodiments.
FIG. 3 is a conceptual diagram for explaining operations of the packet transfer apparatus according to the first embodiment.

Hereinafter, embodiments according to the present invention will be described with reference to the drawings.

First Embodiment

FIG. 1 shows a packet transfer apparatus 10 according to a first embodiment and a peripheral configuration thereof.

The packet transfer apparatus 10 is connected to a first network segment 100 and a second network segment 200. A first computer 110 which functions as a Web server (A) here is connected on the first network segment 100. Further, it is assumed that a second computer 210 which functions as a Web server (B) here is connected on the second network segment 200.

The packet transfer apparatus 10 comprises a packet reception unit 11, a source address detection unit 12, an address storage unit 13, a packet acquisition unit 14, a file extraction processing unit 15, a file storage unit 16, a packet reception processing unit 17, a packet generation unit 18, and a packet transmission unit 19.

The packet reception unit 11 receives a packet transferred from the first network segment 100 or the second network segment 200. The source address detection unit 12 detects a source MAC address, a source IP address, and a source port number of the packet received in the packet reception unit 11. The address storage unit 13 stores respective addresses of a source, a destination, and the apparatus itself (refer to FIG. 2).

Figure 4:
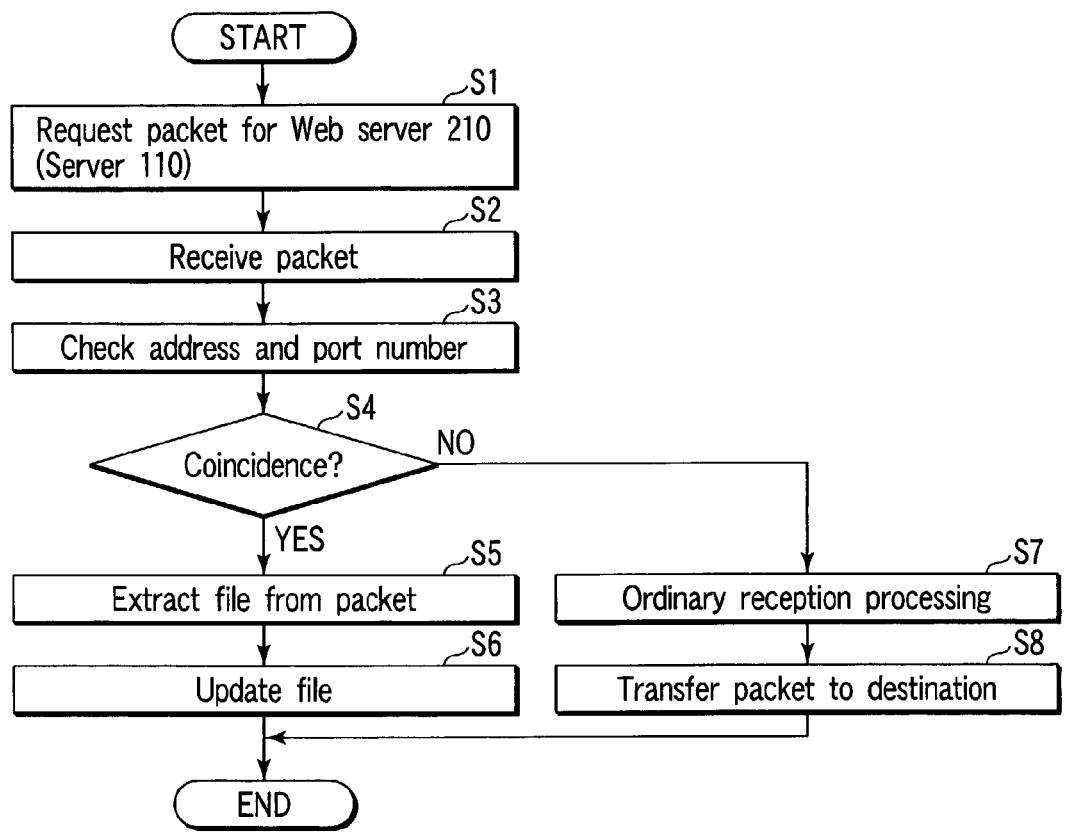
FIG. 4 is a flow chart for explaining operations of the packet transfer apparatus according to the first embodiment.

The packet acquisition unit 14 acquires a packet which is requested in the state where stealth characteristics are secured from packets received in the packet reception unit 11 (refer to FIGS. 3 and 4). Specifically, the packet acquisition unit 14 identifies the request packet with reference to address information (including port number) stored in the address storage unit 13.

The file extraction processing unit 15 extracts a file from the packet acquired in the packet acquisition unit 14 and stores the file in the file storage unit 16. The file means an update file of a program or data for updating, for example, a software used in the apparatus 10.

The packet reception processing unit 17 performs reception processing (that is, transfer processing) of ordinary packets received in the packet reception unit 11. The ordinary packets are packets other than the request packets which are identified in the packet acquisition unit 14, and which have passed through the packet acquisition unit 14.

The packet generation unit 18 generates a packet to be transmitted from the packet transfer apparatus 10. In the present embodiment, the packet generation unit 18 generates a request packet for requesting, for example, an update file. The packet transmission unit 19 transmits the packet reception-processed in the packet reception processing unit 17 (received packet) or the request packet generated in the packet generation unit 18 on the first network segment 100 or the second network segment 200.

The first computer 110 and the second computer 210 may be an SMTP (mail) server and the like other than the Web servers (A) and (B). In other words, the first computer 110 and the second computer 210 mean devices which can be connected to the network to be communicated using a unique address (including port number) such as an IP address. Further, of course, the first computer 110 and the second computer 210 may be computers of different types from each other (for example, Web server and other server).

(Address Storage Unit)

FIG. 2 conceptually shows storage contents of the address storage unit 13. In other words, description will be made with respective storage areas 131 to 139 of the address storage unit 13 as a matrix structure.

The MAC address storage areas 131, 134, and 137 hold a MAC address of the computer 110 which is the source Web server (A) here, a MAC address of the computer 210 which is the destination Web server (B), and a MAC address of the apparatus 10, respectively.

The IP address storage areas 132, 135, and 138 hold an IP address of the computer 110 which is the source Web server (A), an IP address of the computer 210 which is the destination Web server (B), and an IP address of the apparatus 10, respectively.

The port number storage areas 133, 136, and 139 hold a port number of the computer 110 which is the source Web server (A), a port number of the computer 210 which is the destination Web server (B), and a port number of the apparatus 10, respectively.

(Packet Transfer Operation)

Hereinafter, operations of the apparatus 10 will be described with reference to FIGS. 1 to 4.

FIG. 3 is a diagram for conceptually explaining operations of the apparatus 10. A process 10A means a packet transfer processing which is performed for requesting, for example, an update file necessary for update of a software in the state where stealth characteristics are secured in the apparatus 10. Further, a process 10C means an ordinary packet transfer processing of the apparatus 10.

Here, the apparatus 10 transmits a packet for requesting transfer of update file to the second computer 210 which is the Web server (B) in the state where stealth characteristics are secured (step S1). In other words, the apparatus 10 acquires the request packet (including update file) without transmitting address information (including port number) of the apparatus 10 itself on the network.

Specifically, the apparatus 10 performs download request of update file with respect to the Web server (B), using address information of the first computer 110 which is the Web server (A) connected to the first network segment 100. In other words, as shown in FIG. 3, the apparatus 10 sets the address information of the Web server (A) (MAC address, IP address "A", and port number "80") as source address information. Further, address information of the Web server (B) (MAC address, IP address "B", and port number "80") is set as destination address information (process 10A).

Here, the port number "80" is included in reserved Well-known port number (0 to 1023), and is generally a port number for dealing with Web information (Web page).

The apparatus 10 generates a packet including the source address information and the destination address information as described above in the packet generation unit 18, and transmits it from the packet transmission unit 19 to the second network segment 200.

Here, in the apparatus 10, the packet generation unit 18 generates an ARP (Address Resolution Protocol) packet for acquiring the MAC address of the Web server (B) which is the destination computer 210, and broadcasts it to the second network segment 200. At this time, the packet generation unit 18 uses the address information of the Web server (A) as the source address information.

When a response packet for the ARP packet is received from the Web server (B) of the second network segment 200, the apparatus 10 acquires the MAC address and the IP address of the Web server (B) from the response packet. The apparatus 10 stores the acquired MAC address and IP address in the address storage unit 13. In other words, as shown in FIG. 2, the MAC address, the IP address, and the port number "80" of the web server (B) which is the destination computer 210 are stored in the storage areas 134, 135, and 136 of the address storage unit 13, respectively.

On the other hand, in a similar manner, the apparatus 10 generates the ARP packet, broadcasts it to the first network segment 100, and receives the response packet from the Web server (A). The apparatus 10 acquires the MAC address and the IP address of the Web server (B) which is the source computer 110 from the response packet, and stores them in the address storage unit 13. Alternatively, the packets transferred from the first network segment 100 to the second network segment 200 may be examined. In this case, the MAC address is acquired from any packet that has the IP address of the Web server (A) and stored into the address storage unit 13. In other words, as shown in FIG. 2, the MAC address, the IP address, and the port number "80" of the Web server (A) which is the source computer 110 are stored in the storage areas 131, 132, and 133 of the address storage unit 13, respectively.

As described above, the packet generation unit 18 generates the packet including the address information of the Web server (A) as the source address information and the destination address information of the Web server (B) with reference to the address storage unit 13. The packet transmission unit 19 transmits the packet (request packet for requesting download of update file) to the second network segment 200.

Next, it is assumed that the apparatus 10 receives the response packet for the request packet from the destination Web server (B) (step S2). In the apparatus 10, when the response packet is received from the second network segment 200, the packet reception unit 11 transfers it to the packet acquisition unit 14.

The packet acquisition unit 14 checks the address and the port number of the received packet with reference to the address storage unit 13 (step S3). In other words, the source IP address of the received packet and the storage area 135 of the address storage unit 13 are compared. Further, the source port number and the storage area 136 are compared. Further, the destination IP address and the storage area 132 are compared. The destination port number and the storage area 133 are compared.

When the check result shows coincidence, the packet acquisition unit 14 recognizes that the received packet is the response packet for the apparatus 10, and transfers it to the file extraction processing unit 15 (YES in step S4). The file extraction processing unit 15 extracts the requested update file from the packet acquired in the packet acquisition unit 14 (response packet from the Web server (B)), and stores it in the file storage unit 16. Thereby, the apparatus 10 updates the program or data for updating, for example, a software which is being used (step S6).

On the other hand, when the check result does not show coincidence, the packet acquisition unit 14 passes the packet as an ordinary packet to the packet reception processing unit 17 (NO in step S4).

The packet reception processing unit 17 performs ordinary packet reception processing (transfer processing) to transfer the packet to the packet transmission unit 19 (step S7). The packet transmission unit 19 transmits the packet to the first network segment 100 here in order to transfer the packet to a designated destination (step S8).

The ordinary packet transfer processing corresponds to the process 10C of the apparatus 10 shown in FIG. 3. In other words, when the packet (request packet) whose source (IP address "C", source port number "1100") is a Web browser of a device 120 connected to the first network segment 100 is received, the apparatus 10 transfers the packet to the Web server (B) connected to the second network segment 200.

The Web server (B) transmits the response packet including the requested Web information to the second network segment 200. When the response packet is received, the apparatus 10 performs ordinary transfer processing to transfer the packet to the device 120 connected to the first network segment 100.

As described above, according to the present embodiment, when the apparatus 10 requests the response packet including an update file and the like required by the apparatus 10 itself for the server (here, computer 210 which is the Web server (B)) on the network, the apparatus 10 uses the address information of another server (computer 110 which is the Web server (A)) without using the address information (including port number) of the apparatus 10 itself. Here, both the destination port number and the source port number are set to the port number "80" as the address information. The port number "80" is included in the reserved Well-known port number (0 to 1023) and assigned to a port for receiving requests. Therefore, the port number "80" is not used as the source address information included in the packet from the ordinary device 120. Thereby, the apparatus 10 can identify the packet for the apparatus 10 itself.

Therefore, the apparatus 10 can use the address information of another server or the like to identify and acquire the packet for the apparatus 10 itself without transmitting the address information of the apparatus 10 itself on the network. In other words, the apparatus 10 can acquire the request packet and download a required update file from the packet in the state where so-called stealth characteristics are secured.

Generally, the source IP address of the packet coming from the request source is the IP address of the request source itself. Further, the source port number is a number appropriately assigned by the device at the request source. A number equal to or more than "1024" other than the Well-known port number (0 to 1023) is generally used as the port number. In other words, since the packet wherein both the source port number and the destination port number are "80" cannot generally be present, the apparatus 10 can recognize that the packet is the response packet for the apparatus 10 itself.

In the first embodiment, there is assumed a specific example where the port number "80" is used as the source port number and the destination port number. However, not limited thereto, when not the Web server but the SMTP (mail) server is assumed, it is preferable that the port number "25" is used as the source port number and the destination port number. In other words, the source port number and the destination port number may be unique numbers assigned to the first and second computers 110 and 210.

Second Embodiment

Figure 6:
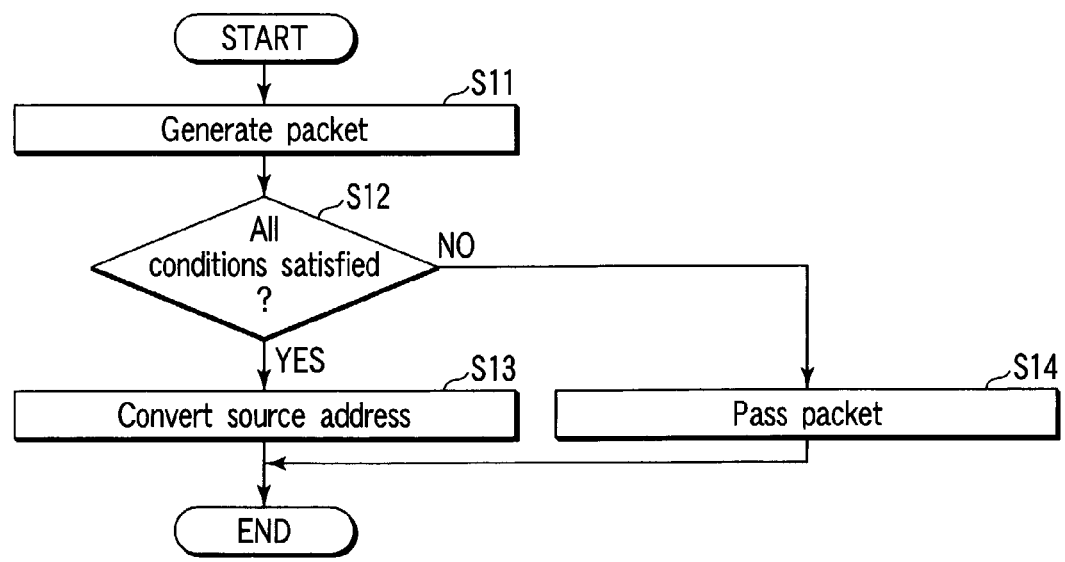
FIG. 6 is a flow chart for explaining operations of the packet transfer apparatus according to the second embodiment.
Figure 5:
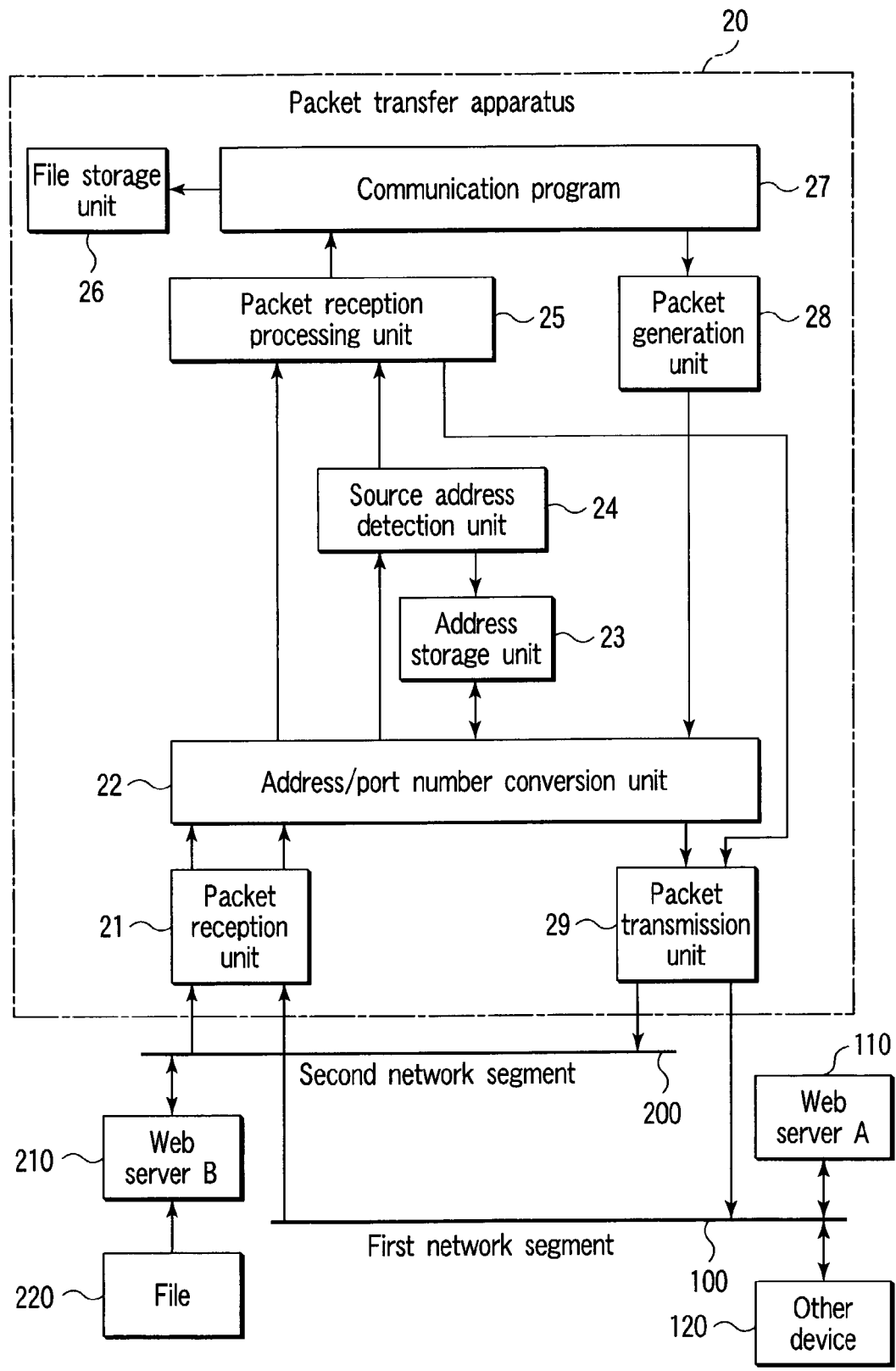
FIG. 5 is a block diagram showing essential parts of a packet transfer apparatus according to the second embodiment.

FIGS. 5 and 6 are diagrams according to a second embodiment of the present invention.

The packet transfer apparatus 10 according to the first embodiment is configured such that the packet generation unit 18 generates a request packet and the file data extraction processing unit 15 acquires a requested update file. Therefore, the apparatus 10 requires processing units dedicated for respective processings.

A packet transfer apparatus 20 according to the second embodiment is configured such that download processing of update file is performed by a general user program (communication program 27).

The apparatus 20 is connected to the first network segment 100 and the second network segment 200 as shown in FIG. 5. Further, the apparatus 20 comprises a packet reception unit 21, an address/port number conversion unit 22, an address storage unit 23, a source address detection unit 24, a packet reception processing unit 25, a file storage unit 26, the communication program 27, a packet generation unit 28, and a packet transmission unit 29.

Hereinafter, the packet transfer operation of the apparatus 20 will be described with reference to FIGS. 5, 6 and 2. FIG. 6 is a flow chart showing a processing procedure of download request of update file according to the present embodiment.

In the address storage unit 23, as described above, the MAC address, the IP address, and the port number of the computer 210 (Web server (B)) are stored in the storage areas 134 to 136, respectively, as shown in FIG. 2. Further, the source port number used in the communication program described later is stored in the storage area 139.

When the packet reception unit 21 receives a packet from a device connected to the first network segment 100, the source address detection unit 24 checks the source MAC address and the source IP address of the packet. The source address detection unit 24 stores the acquired MAC address and IP address in the storage areas 131 and 132 of the address storage unit 23, respectively. Further, the MAC address and the IP address of the computer 110 (Web server (A)) are stored in the storage areas 131 and 132, respectively.

The packet reception processing unit 25 determines that the packet checked in the source address detection unit 24 is the packet to be transferred, and transmits it via the packet transmission unit 29 to the second network segment 200.

Here, when the apparatus 20 requests an update file for the Web server (B), the packet generation unit 28 generates a packet for download request by the communication program 27. As shown in FIG. 6, the packet transmission unit 29 transmits the packet to the Web server (B) connected to the second network segment 200 (step S11). At this time, since the apparatus 20 transmits the packet for download request to the second network segment 200, combination information of the IP address of the Web server (B) and a network interface connected to the second network segment 200 is registered in a routing table of the OS.

Further, the apparatus 20 broadcasts the ARP packet to the second network segment 200 in order to acquire the destination MAC address. At this time, the apparatus 20 uses the address information of the Web server (A) as the source address. In response to the request by this ARP packet, the apparatus 20 receives the response packet from the Web server (B), and registers the MAC address with respect to the Web server (B) in an ARP cache managed by the OS. Thereby, the communication program 27 can use the address registered in the ARP cache by the OS as the destination MAC address of the packet for the Web server (B).

The packet generation unit 28 assigns the MAC address and the IP address of the apparatus 20 as the source MAC address and the source IP address, and assigns a unused port number of the apparatus 20 as the source port number. This port number is a number which is the same number as the port number stored in the storage area 139 of the address storage unit 23.

The address/port number conversion unit 22 checks the source IP address, the source port number, the destination IP address, and the destination port number of the packet generated in the packet generation unit 28 (step S12). In other words, the address/port number conversion unit 22 checks whether or not the source IP address is the IP address of the apparatus 20 (number in the storage area 138).

Further, it is checked whether or not the source port number is the port number used by the communication program 27 (number in the storage area 139). Further, it is checked whether or not the destination IP address is the IP address of the Web server (B) (number in the storage area 135) and the destination port number is the port number of the Web server (B) (number in the storage area 136).

When all the conditions are satisfied, the address/port number conversion unit 22 performs source address conversion processing (YES in step S12, S13). In other words, the address/port number conversion unit 22 converts the source port number to the port number "80" of the Web server (A). Further, the source IP address is converted to the IP address of the Web server (A) (number in the storage area 132). Further, the source MAC address is converted to the number in the storage area 131 of the address storage unit 23.

After such a conversion processing, the packet transmission unit 29 transmits the packet to the second network segment 200. Thereby, the packet transmitted from the packet transmission unit 29 is recognized as if it was transferred from the Web server (A) from the viewpoint of the Web server (B) on the second network segment 200.

Here, the source port number is set to the port number "80" of the HTTP protocol. This is directed for identifying the response packet of the Web server (B). Therefore, in the case of the SMTP (mail) server, the source port number may be set to the port number "25."

On the other hand, when all the conditions are not satisfied, the address/port number conversion unit 22 does not perform address conversion processing for the packet, passes and transfers the packet to the packet transmission unit 29 as it is (NO in step S12, S14).

The above is the transmission processing of the packet for download request. Next, reception processing of the response packet for the request will be described.

The address/port number conversion unit 22 monitors the response of the Web server (B) for the download request. Specifically, the address/port number conversion unit 22 checks the source IP address, the source port number, the destination IP address, and the destination port number of the packet received in the packet reception unit 21.

Here, when the check result satisfies all the conditions described above, the address/port number conversion unit 22 performs conversion processing to transfer the packet to the packet reception processing unit 25. In other words, this is the case where the source IP address is the IP address of the Web server (B) (number in the storage area 135) and the source port number is the port number of the Web server (B) (number in the storage area 136). Further, this is the case where the destination IP address is the IP address of the Web server (A) (number in the storage area 132) and the destination port number is the port number "80" of the Web server (A).

The address/port number conversion unit 22 converts the destination port number to the number in the storage area 139, and the destination IP address to the number in the storage area 138. Further, the address/port number conversion unit 22 converts the destination MAC address to the number in the storage area 137.

When the packet is received from the address/port number conversion unit 22, the packet reception processing unit 25 interprets that the packet is the packet for the communication program 27 of the apparatus 20, and transfers the packet to the communication program 27. The communication program 27 receives the packet from the packet reception processing unit 25, extracts data (update file) from the packet, creates a target local file, and stores it in the file storage unit 26.

As described above, it is possible to request download of file from, for example, the Web server (B) without transmitting the address information of the apparatus itself on the network also in the packet transfer apparatus 20 according to the present embodiment.

Third Embodiment

FIG. 7 is a diagram showing essential parts of a packet transfer apparatus 10 according to a third embodiment. The apparatus 10 according to the present embodiment is similar to the apparatus according to the first embodiment shown in FIG. 1 in the basic configuration. Hereinafter, only different structures will be described.

In other words, the apparatus 10 comprises an input unit 400 for registering address information (including port number) in the address storage unit 13. An operator can operate the input unit 400 to set the source MAC address, the source IP address, and the source port number in the storage areas 131 to 133, respectively, as shown in FIG. 2.

The input unit 400 can be applied for setting processing to the address storage unit 23 of the packet transfer apparatus 20 shown in FIG. 5.

Therefore, when any of the packet transfer apparatuses according to the first to third embodiments is employed, communication with a device such as a Web server on the network is enabled in the state where so-called stealth characteristics are secured. Therefore, the apparatuses are effective particularly when download of update file and the like necessary for updating, for example, a software of the apparatus is performed from a server or the like on a network instead of that the presence of the apparatus on the network is not known.

What is claimed is:

1. An apparatus for transferring packets among network segments in a network, comprising:

address storage means for storing a MAC address, an IP address, and a port number of a first computer connected to a first network segment as a source, and a MAC address, an IP address, and a port number of a second computer connected to a second network segment as a destination;

packet request means for transmitting a request packet for transferring of a file with the first computer and with the second computer, the packet request means generating the request packet including source address information using the MAC address, the IP address, and the port number of the first computer stored in the address storage means;

determining means for, when a packet transmitted from the second computer is received, determining whether or not the packet is a response packet whose destination is the first computer, the response packet corresponding to the request packet, the determining means determining that the received packet is the response packet when the received packet includes address information which is coincident with at least the IP address and the port number stored in the address storage means;

means for, when it is determined by the determining means that the received packet is not the response packet, transferring the received packet to a designated destination;

acquiring means for, when it is determined by the determining means that the received packet is the response packet, acquiring the response packet;

extracting means for extracting and storing the requested file from the response packet acquired by the acquiring means; and packet generation means for generating a reguest packet for requesting download of data or a file for the second computer using the MAC address, the IP address, and a port number of the apparatus.

2. The apparatus according to claim 1, further comprising:
means for acquiring address information of the first computer from the first computer through transmission of an ARP packet and storing it in the address storage means.

3. The apparatus according to claim 1, further comprising:
means for acquiring address information of the second computer from the second computer through transmission of an ARP packet whose source is address information of the first computer, and storing it in the address storage means.

4. The apparatus according to claim 1, further comprising:
address/port number conversion means for, when the request packet generated in the packet generation means is transmitted to the second computer of the second network segment, converting the MAC address and the IP address of the apparatus of the request packet to the MAC address and the IP address of the first computer stored in the address storage means, and further converting the port number to a unique port number used by the first computer.

5. The apparatus according to claim 1, further comprising:
converting means for, when a response packet from the second computer is received, at least a source IP address, a source port number, and a destination IP address of the response packet are all coincident with corresponding addresses stored in the address storage means, and it is determined that a destination port number is a unique port number, converting a destination MAC address, a destination IP address, and a destination port number of the response packet to a MAC address, an IP address, and a port number of the apparatus.

6. The apparatus according to claim 1, wherein the address storage means stores first address information including the MAC address, the IP address, and the port number of the first computer, and second address information including the MAC address, the IP address, and the port number of the second computer; and further comprising:

input means for registering the first address information and the second address information in the address storage means.

7. A method of transferring packets among network segments in a network, comprising the steps of:

storing a MAC address, an IP address, and a port number of a first computer connected to a first network segment as a source, and a MAC address, an IP address, and a port number of a second computer connected to a second network segment as a destination, in a storage unit;

requesting a request packet transmission for transferring of a file with the first computer and with the second computer, the request packet including source address information using the MAC address, the IP address, and the port number of the first computer stored in the storage unit;

determining, when a packet transmitted from the second computer is received, whether or not the packet is a response packet whose destination is the first computer, the response packet corresponding to the request packet, including determining that the packet is the response packet when the received packet includes address information which is coincident with at least the IP address and the port number stored in the storage unit;

transferring the received packet to a designated destination, when it is determined by the determining step that the received packet is not the response packet;

acquiring the response packet, when it is determined by the determining step that the received packet is the response packet;

extracting and storing the requested file from the acquired response; and generating a request packet for requesting download of data or a file for the second computer usinq the MAC address, the IP address, and a port number of a packet transfer apparatus.

* * * * *

UNITED STATES PATENT AND TRADEMARK OFFICE
CERTIFICATE OF CORRECTION

| | |
|---|---|
| PATENT NO. | : 7,359,338 B2 |
| APPLICATION NO. | : 10/228951 |
| DATED | : April 15, 2008 |
| INVENTOR(S) | : Yoshimura |

It is certified that error appears in the above-identified patent and that said Letters Patent is hereby corrected as shown below:

Claim 1, column 10, line 7, change "reguest" to --request--.

Claim 7, column 12, line 7, change "usinq" to --using--.

Signed and Sealed this

Eighth Day of July, 2008

JON W. DUDAS
*Director of the United States Patent and Trademark Office*